(12) United States Patent
Dubois et al.

(10) Patent No.: US 12,054,241 B2
(45) Date of Patent: Aug. 6, 2024

(54) LANDING GEAR LOCKING DEVICE

(71) Applicant: SAFRAN LANDING SYSTEMS, Velizy-Villacoublay (FR)

(72) Inventors: Sébastien Dubois, Velizy (FR); Aurélien Doux, Velizy (FR); Philippe Henrion, Velizy (FR); Vincent Pavoine, Velizy (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 49 days.

(21) Appl. No.: 18/011,939

(22) PCT Filed: Jun. 21, 2021

(86) PCT No.: PCT/EP2021/066882
§ 371 (c)(1),
(2) Date: Dec. 21, 2022

(87) PCT Pub. No.: WO2021/259878
PCT Pub. Date: Dec. 30, 2021

(65) Prior Publication Data
US 2023/0356830 A1 Nov. 9, 2023

(30) Foreign Application Priority Data
Jun. 23, 2020 (FR) ........................................ 2006560

(51) Int. Cl.
*B64C 25/26* (2006.01)
*B64C 25/22* (2006.01)

(52) U.S. Cl.
CPC .............. *B64C 25/26* (2013.01); *B64C 25/22* (2013.01)

(58) Field of Classification Search
CPC ................................. B64C 25/26; B64C 25/22
See application file for complete search history.

(56) References Cited

U.S. PATENT DOCUMENTS 2,365,424 A * 12/1944 Mercier ................... B64C 25/22
244/102 SL
2,410,967 A * 11/1946 Eaton ...................... B64C 25/22
244/102 R
(Continued)

FOREIGN PATENT DOCUMENTS

EP 3 495 263 A1 6/2019
EP 3 539 867 A1 9/2019
(Continued)

OTHER PUBLICATIONS

International Search Report of PCT/EP2021/066882 dated Sep. 16, 2021 [PCT/ISA/210].

*Primary Examiner* — Philip J Bonzell
*Assistant Examiner* — Ashesh Dangol
(74) *Attorney, Agent, or Firm* — Sughrue Mion, PLLC

(57) ABSTRACT

A locking device locks a landing gear mounted in rotation on an aircraft and includes a deployment hydraulic jack including a first chamber connected to a first hydraulic supply and a second chamber connected to a second hydraulic supply. The locking device includes a hydraulic actuator connected to a rotary distributor. The rotary distributor includes a coupling operationally connecting the rotary distributor to a strut of the landing gear, a first supply port fluidly connected to the first hydraulic supply, and a first outlet port fluidly connected to the hydraulic actuator.

11 Claims, 15 Drawing Sheets

(56) References Cited

U.S. PATENT DOCUMENTS

| | | | | |
|---|---|---|---|---|
| 2,459,665 | A | * | 1/1949 | Majneri .................. B64C 25/22 |
| | | | | 244/102 R |
| 3,107,886 | A | * | 10/1963 | Bossler, Jr. ............. B64C 25/22 |
| | | | | 92/108 |
| 2011/0163202 | A1 | * | 7/2011 | Martinez ................. B64C 25/26 |
| | | | | 244/102 SL |
| 2015/0314860 | A1 | * | 11/2015 | Henrion .................. B64C 25/26 |
| | | | | 244/102 A |
| 2016/0222993 | A1 | * | 8/2016 | Goldring ............ F15B 15/1452 |
| 2020/0094950 | A1 | * | 3/2020 | Bennett ................... B64C 25/20 |

FOREIGN PATENT DOCUMENTS

| | | |
|---|---|---|
| FR | 2 801 865 A1 | 6/2001 |
| FR | 2 928 623 A1 | 9/2009 |

* cited by examiner

LANDING GEAR LOCKING DEVICE

CROSS REFERENCE TO RELATED APPLICATIONS

This application is a National Stage of International Application No. PCT/EP2021/066882, filed Jun. 21, 2021, claiming priority to French Patent Application No. 2006560, filed Jun. 23, 2020, the contents of each of which being herein incorporated by reference in their entireties.

FIELD OF THE INVENTION

The invention relates to the field of deployable aircraft landing gears and more specifically, devices for locking the landing gear in position.

BACKGROUND OF THE INVENTION

Conventionally, an aircraft landing gear comprises a landing gear strut, a first end of which is articulated on the aircraft, and a second end of which carries a wheel set. A deployment jack extends between the structure of the aircraft and the landing gear strut and makes it possible to selectively move the landing gear between a deployed position and a retracted position. Generally, such a landing gear comprises a device for locking the strut in its deployed and/or retracted position. This locking device comprises a stabilisation member which holds the locking device in its state, prior to controlling the deployment jack.

Such a device does not make it possible to act on the locking device and to ensure its state. In the case of a solid landing gear, the stabilisation member sized to deliver sufficient forces is bulky and heavy.

OBJECT OF THE INVENTION

The invention has the object of improving the compactness and the reliability of a landing gear locking device.

SUMMARY OF THE INVENTION

To this end, a locking device is provided, intended to lock a landing gear rotatably mounted on an aircraft and which is equipped with a hydraulic deployment jack comprising a first chamber connected to a first hydraulic supply and a second chamber connected to a second hydraulic supply. The locking device comprises a hydraulic actuator connected to a rotary distributor. The rotary distributor comprises means for operationally connecting the rotary distributor to the landing gear, a first supply port fluidly connected to the first hydraulic supply and a first outlet port fluidly connected to the hydraulic actuator.

Thus, the state of the distributor supplying the locking device is mechanically indexed on the position of the landing gear and does not require separate controlling or dedicated controlled fluid connection. The locking device thus simplified has an increased reliability.

Advantageously, the actuator is a jack comprising a third chamber connected to the first outlet port. Furthermore, the actuator can comprise a fourth chamber, the rotary distributor comprising a second supply port fluidly connected to the second hydraulic supply and a second outlet port fluidly connected to the fourth chamber.

According to a preferred embodiment, the rotary distributor is arranged such that:

in a first state, the first supply port is connected to the second outlet port and the second supply port is connected to the first outlet port;

in a second state, the first supply port is connected by a first restrictor to the first outlet port and to the second outlet port, the second supply port is connected by a second restrictor to the first outlet port and to the second outlet port;

in a third state, the first supply port is connected to the first outlet port and the second supply port is connected to the second outlet port.

Preferably, the means for operationally connecting the rotary distributor to the landing gear comprise a coupling to a strut of the landing gear.

Advantageously also, the distributor comprises a third outlet port in constant fluid connection with the first supply port and/or a fourth outlet port in constant fluid connection with the second supply port.

The reliability of the device is further improved when a first connecting pipe between the third port and the hydraulic actuator and a second connecting pipe between the fourth port and the hydraulic actuator are rigid.

The invention also relates to a landing gear intended to be rotatably mounted on an aircraft and equipped with a hydraulic deployment jack comprising a first chamber connected to a first hydraulic supply and a second chamber connected to a second hydraulic supply, the landing gear comprising a locking device of the type described above.

Preferably, a frame of the actuator is secured to a strut of the landing gear which carries a wheel.

Advantageously, the locking device comprises a first locking link articulated on a second locking link, the actuator being connected to the first or the second link.

The invention also relates to an aircraft comprising such a landing gear.

Other features and advantages of the invention appear upon reading the following description of particular, non-limiting embodiments of the invention.

DETAILED DESCRIPTION OF THE INVENTION

Figure 1:
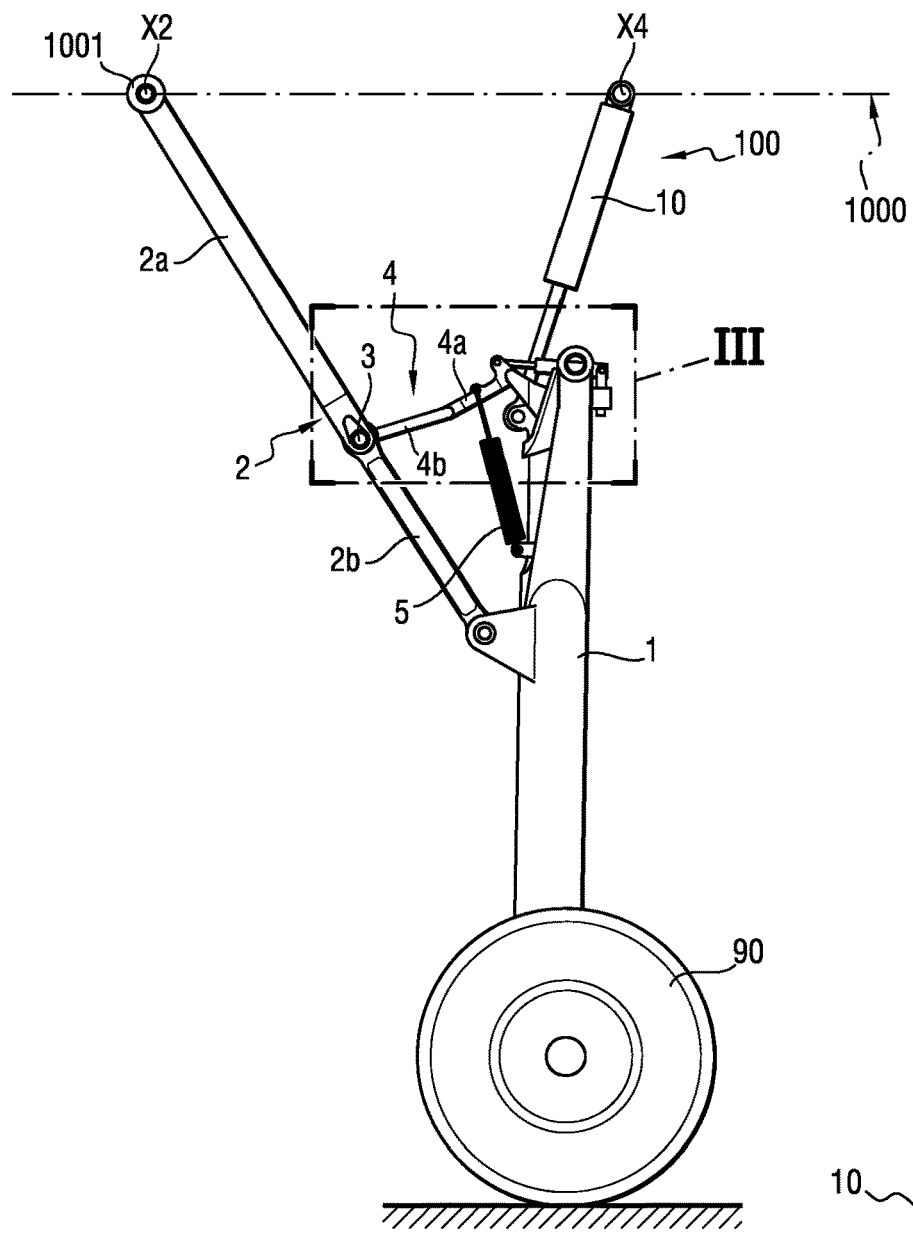
FIG. 1 is a schematic view of a landing gear according to the invention in a deployed position.
Figure 2:
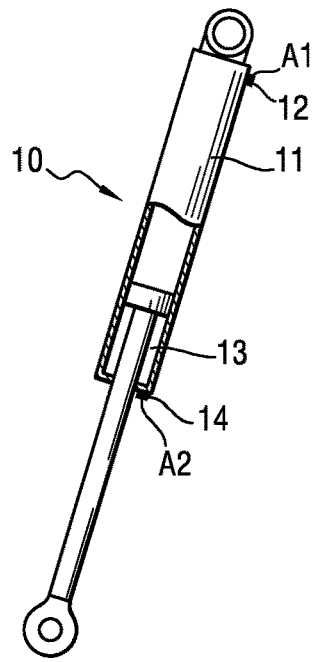
FIG. 2 is a detailed view of a deployment jack of the actuator of FIG. 1.
Figure 3:
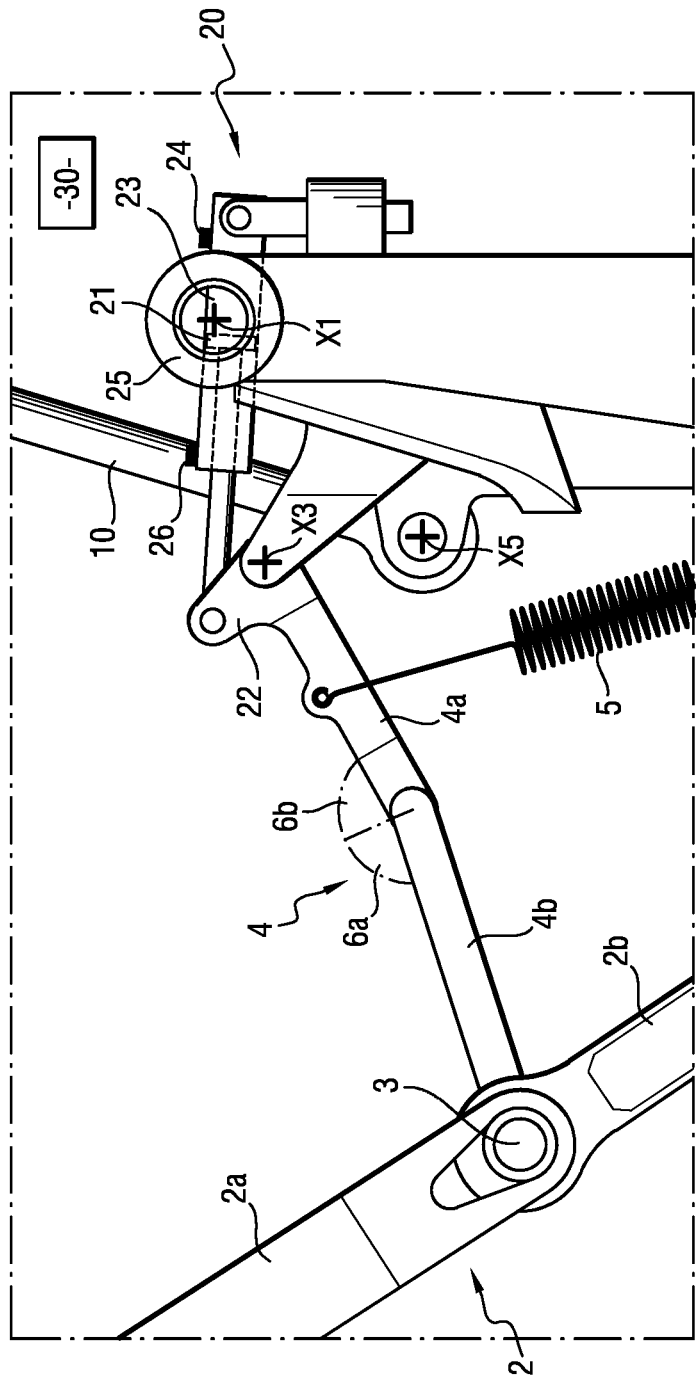
FIG. 3 is a schematic detailed view of the landing gear locking device of FIG. 1.
Figure 4:
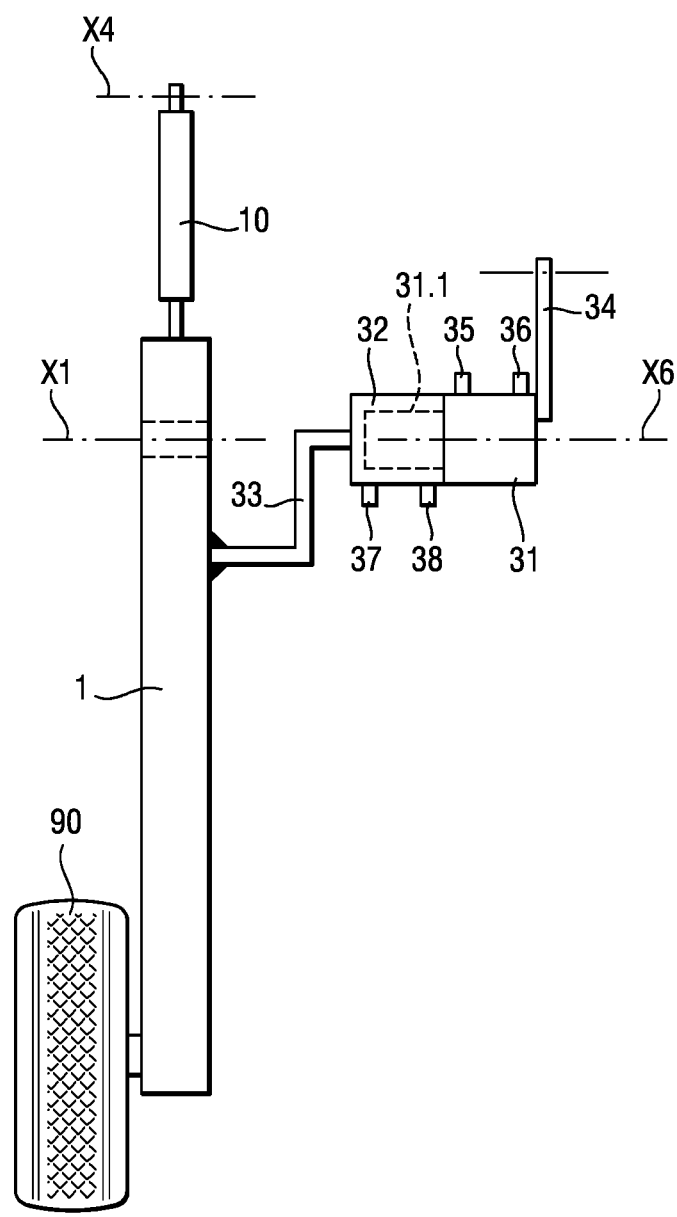
FIG. 4 is a schematic view of the landing gear of FIG. 1.

In reference to FIGS. 1 to 16, the landing gear, generally referenced 100, comprises, in a manner known per se, a strut 1 articulated to the structure of an aircraft 1000 (represented in a dotted line) about an axis of articulation X1 (seen, in this case, at the end) and the distal end of which carries a wheel 90. The strut 1 is movable between a deployed position, illustrated in FIG. 8, in which the landing gear 100 is brought beforehand to a landing, and a retracted position, which is that of the landing gear in flight, which can be seen in FIG. 12. A breaker strut 2 is articulated, on the one hand, on the strut 1 and, on the other hand, on the structure of the aircraft 1000. The breaker strut 2 comprises two connecting rods 2a, 2b, articulated to one another at a knee 3. The connecting rod 2a is moreover articulated on the aircraft 1000 about an axis of articulation X2 in a first point 1001, while the connecting rod 2b is articulated on the strut 1. The breaker strut 2 is brought into a substantially aligned position, by means of a stabilisation member 4 comprising a first link 4a and a second link 4b, also articulated to one another. The first link 4a is articulated on the strut 1 about an axis X3, and the second link 4b is articulated on the breaker strut 2, in this case, at the knee 3. The first and second links 4a, 4b are held in a substantially aligned position by a spring 5 returning the first and second links 4a, 4b to a locking position illustrated in FIG. 1 and in which the first and second links 4a and 4b are aligned. The alignment of the first and second links 4a, 4b is defined by the contacting of a first abutment 6a and a second abutment 6a respectively mounted on the first link 4a and the second link 4b.

Thus stabilised, the breaker strut 2 opposes any rotation of the strut 1 about its axis of articulation X1, such that the deployed position (FIG. 1) is a stable position. As is well-known, the connecting rods 2a, 2b and the links 4a, 4b are designed such that to arrive at the locked position illustrated in FIG. 1, the knee for articulating the connecting rods 2a, 2b and the knee for articulating the first and second links 4a, 4b pass slightly beyond the geometric alignment of the connecting rods 2a, 2b and the geometric alignment of the links 4a, 4b.

A manoeuvring actuator, in this case a first hydraulic deployment jack 10 is articulated, on the one hand, on the aircraft 1000 about an axis of articulation X4, and, on the other hand, on the strut 1 of the landing gear about an axis of articulation X5. The first jack 10 comprises a first chamber 11 provided with a deployment supply port 12 and a second chamber 13 provided with a retraction supply port 14. The deployment supply port 12 is connected by a first tapping at a first hydraulic supply line A1 and the retraction supply port 14 is connected by a second tapping at a second hydraulic supply line A2.

The landing gear 100 also comprises a locking device 20 comprising a second jack 21 connected to a rotary distributor 30. The second jack 21 is articulated, on the one hand, on the strut 1 and, on the other hand, on a lever 22 secured to the first link 4a. The second jack 21 comprises a third chamber 23 provided with a deployment supply port 24 and a fourth chamber 25 provided with a retraction supply port 26.

The rotary distributor 30 comprises a cylindrical plug 31.1, fixed and secured to a base 31, and rotatably received about an axis of rotation X6 in a tubular sleeve 32. The sleeve 32 is rigidly connected to the strut 1 by a crank 33. The base 31 is connected to the structure of the aircraft 1000 by a fixing lug 34.

The base 31 comprises a first supply port 35 and a second supply port 36. The sleeve 32 comprises a first outlet port 37 and a second outlet port 38. Thus, the position of the plug 31.1 in the sleeve 32 is itself indexed on the position of the strut 1 of the landing gear 100 relative to the structure of the aircraft 1000.

Figure 5:
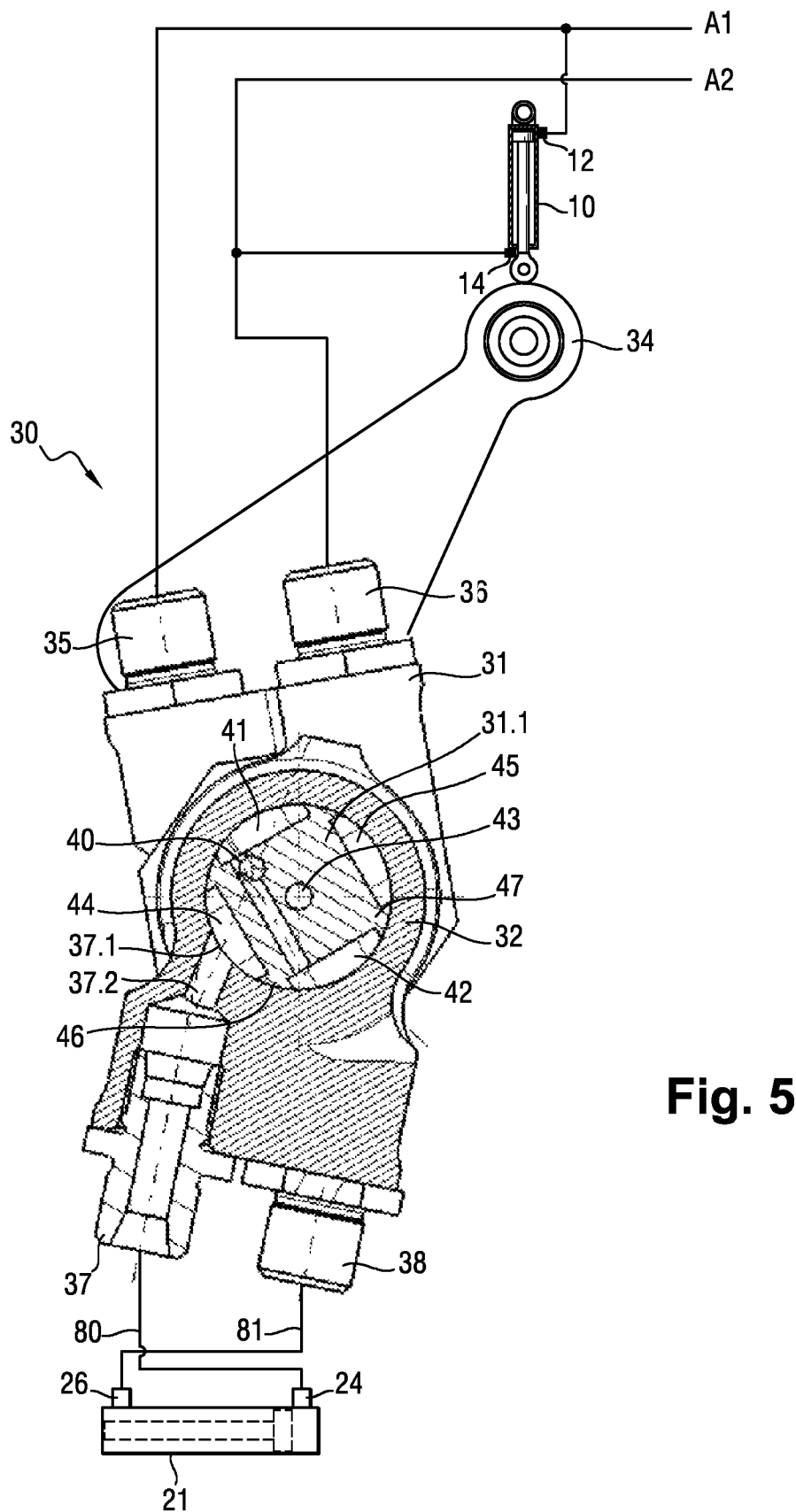
FIG. 5 is a schematic detailed view of a distributor according to a first embodiment of the invention in a first state along a first cut plane.
Figure 6:
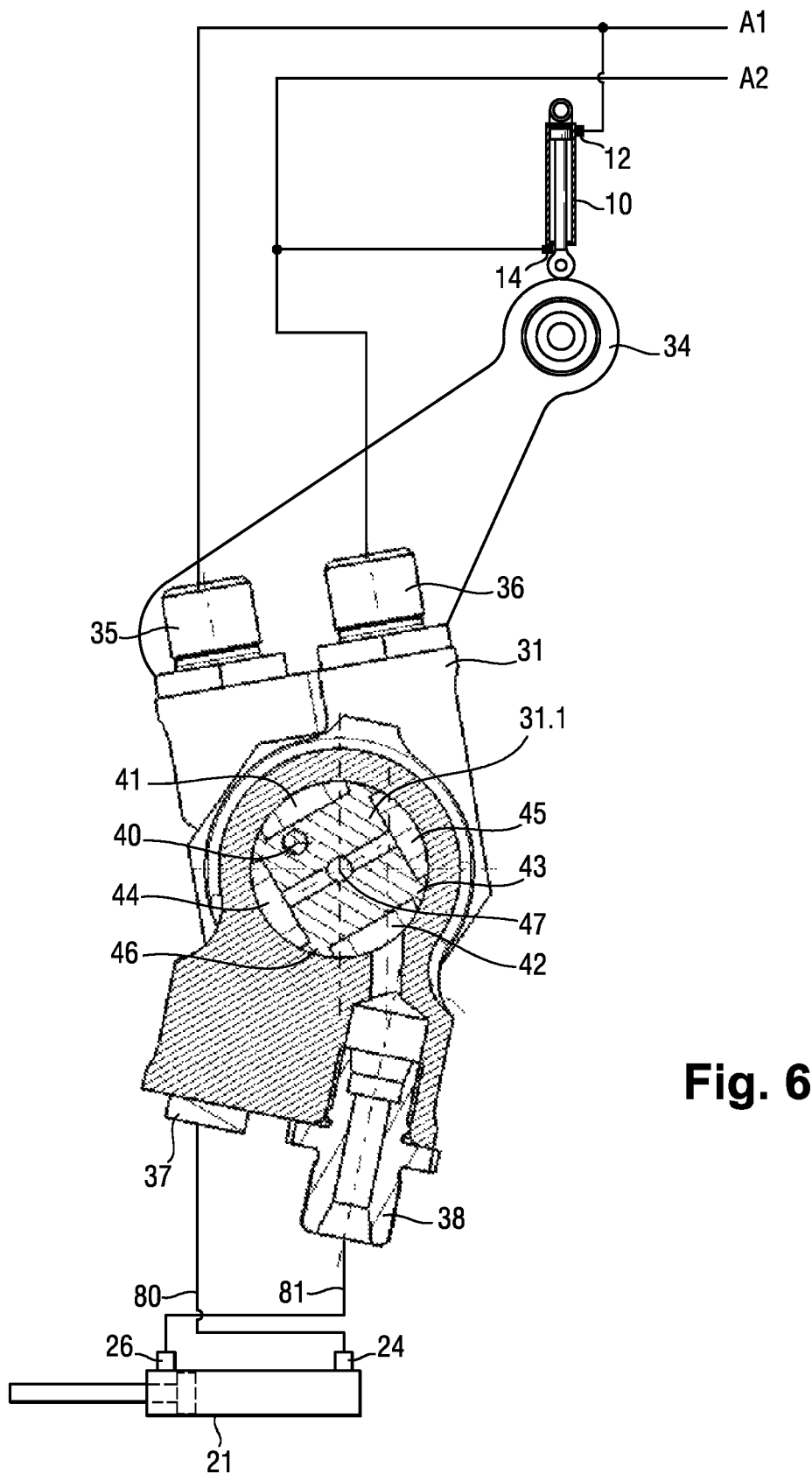
FIG. 6 is a view identical to that of FIG. 5 established along a second cut plane.

As can be seen in FIGS. 5 and 6, a first hydraulic supply line A1 is fluidly connected to the deployment supply port 12 and to the first supply port 35. A second hydraulic supply line A2 is fluidly connected to the retraction supply port 14 and to the second supply port 36. The first outlet port 37 is fluidly connected to the port 24 of the second jack 21 by a first rigid hydraulic connecting pipe 80 (in this case, made of stainless steel) and the second outlet port 38 is fluidly connected to the port 26 of the second jack 21 by a second rigid hydraulic connecting pipe 81 (in this case, made of stainless steel).

The plug 31.1 comprises a first supply conduit 40 fluidly connected to the first supply port 35 and which supplies a first chamber 41 and a second chamber 42. The plug 31.1 also comprises a second supply conduit 43 fluidly connected to the second supply port 36 which supplies a third chamber 44 and a fourth chamber 45. The first chamber 41, the second chamber 42, the third chamber 44 and the fourth chamber 45 are implemented in the form of grooves which extend over the periphery of the plug 31.1 parallel to the axis of rotation of the plug 31.1. The first chamber 41, the second chamber 42, the third chamber 44 and the fourth chamber 45 are located at ninety degrees against one another to the axis X6 of rotation of the plug 31.1. The second chamber 42 is separated from the third chamber 44 by a first cylinder portion 46. The second chamber 42 is separated from the fourth chamber 45 by a second cylinder portion 47.

A third outlet conduit 37.1 connects the first outlet port 37 and leads into the sleeve 32 along a first section 37.2.

A fourth outlet conduit 38.1 connects the second outlet port 38 and leads into the sleeve 32 along a second section 38.2.

The first chamber 41, the second chamber 42, the third chamber 44 and the fourth chamber 45 fluidly connect the first supply port 35, the second supply port 36, the first outlet port 37 and the second outlet port 38 according to several configurations according to the relative angular position of the plug 31.1 and of the sleeve 32.

Thus, in a first state corresponding to a first relative angular position of the sleeve 32 and of the plug 31.1 retained as being between zero and eighty-nine degrees of deviation (in a rotation direction of the strut 1 corresponding to the deployment of the landing gear from its retracted position to its deployed position), the first supply port 35 supplies the second outlet port 38 (FIG. 6) via the second chamber 42. Equivalently, the second supply port 36 supplies the first outlet port 37 (FIG. 5) via the fourth chamber 45.

Figure 7:
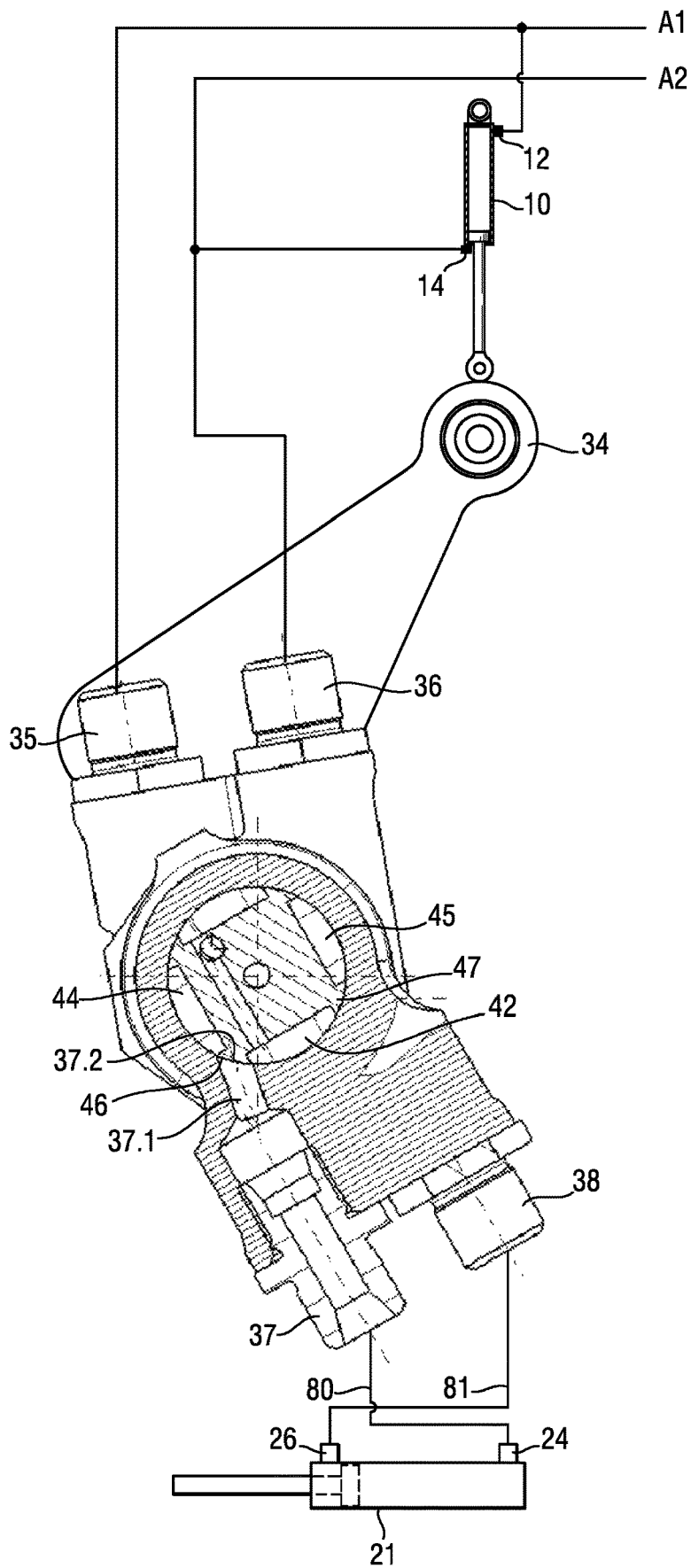
FIG. 7 is a schematic detailed view of the distributor of FIG. 5 in a second state along the first cut plane.
Figure 8:
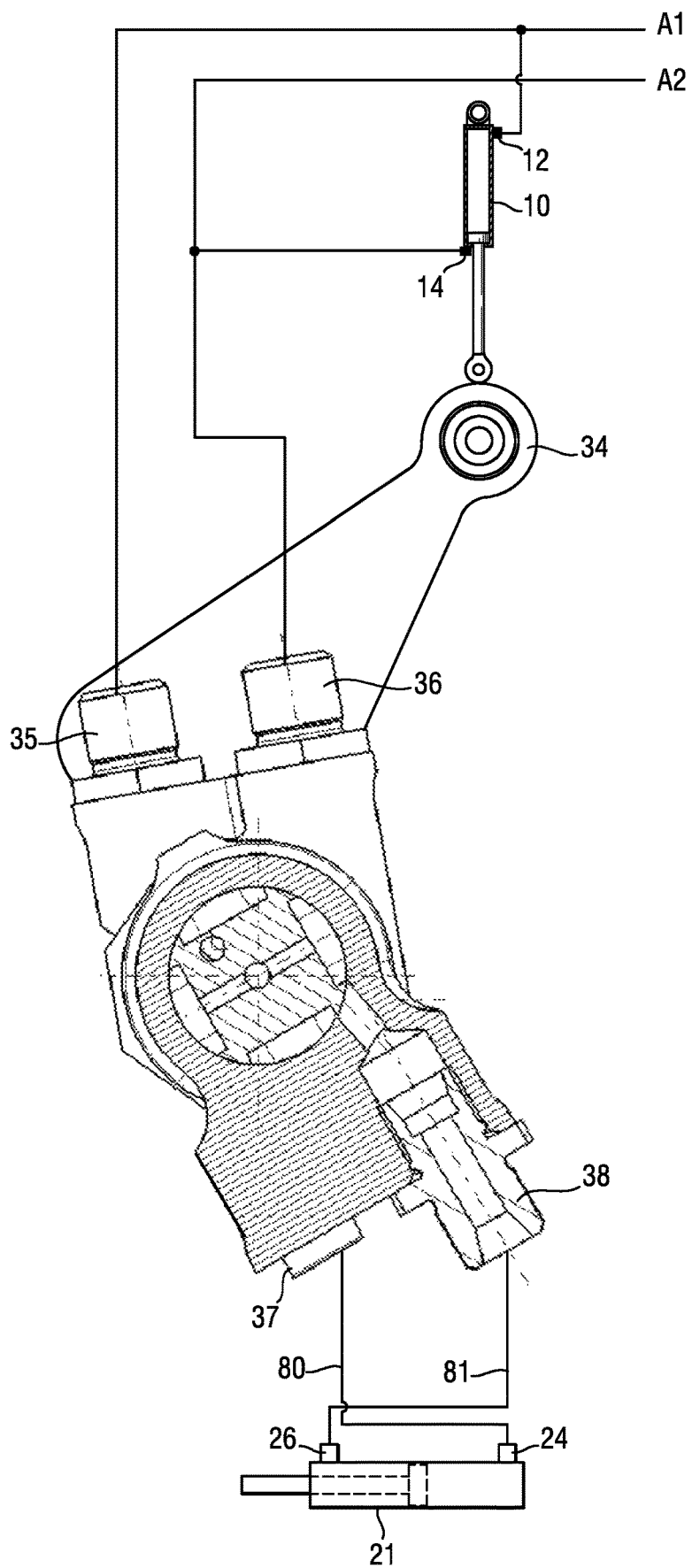
FIG. 8 is a view identical to that of FIG. 7 established along the second cut plane.
Figure 9:
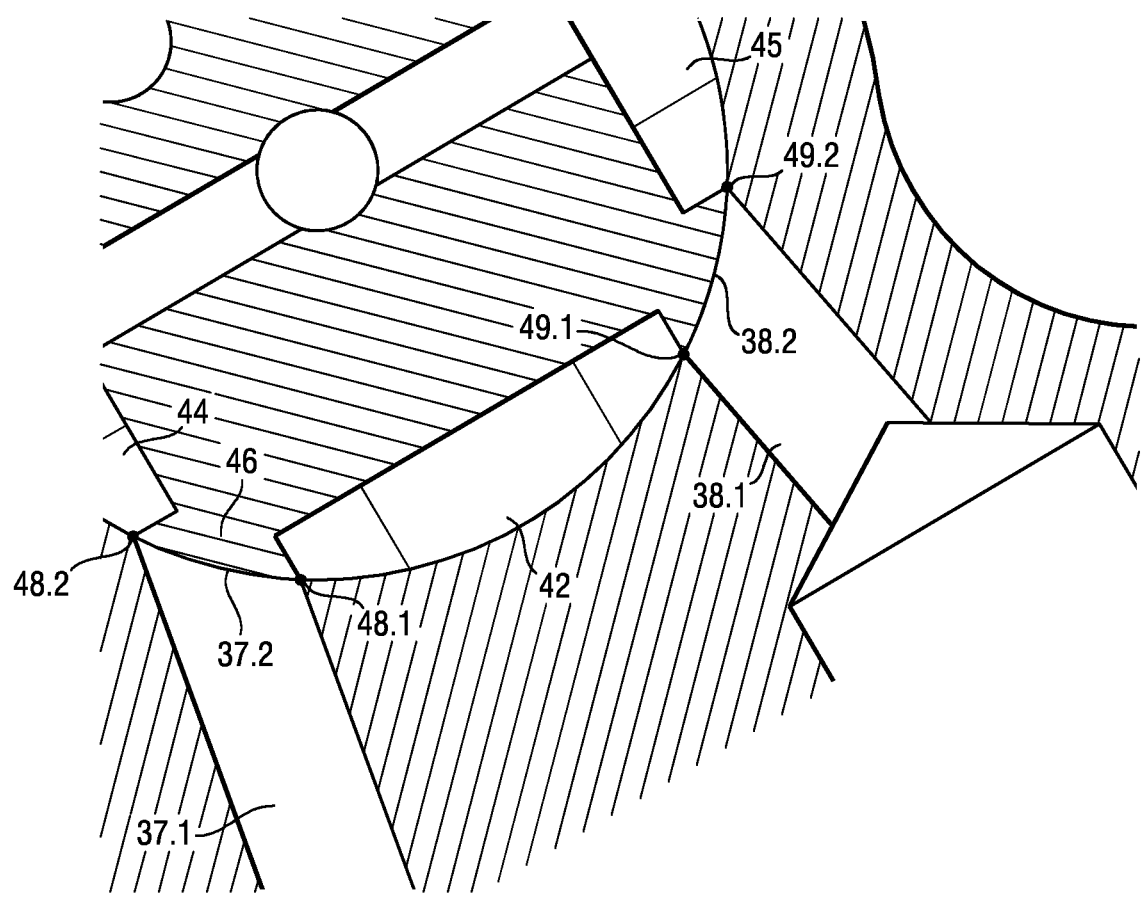
FIG. 9 is a schematic detailed view of the distributor of FIG. 5 in a third state.

In a second state represented in FIGS. 7 to 9, and which corresponds to a second relative angular position of the sleeve 32 and of the plug 31.1 substantially equal to ninety degrees of deviation, the first cylinder portion 46 faces the third outlet conduit 37.1 and the second cylinder portion 47 faces the fourth outlet conduit 38.1. As can be seen more specifically in FIG. 9, the area of the outer surface of the first cylinder portion 46 which faces the third conduit 37.1 is less than the area of the first section 37.2. This difference in area creates a first leakage 48.1 calibrated between the second chamber 42 and the first outlet port 37. This difference in area also creates a second leakage 48.2 calibrated between the third chamber 44 and the first outlet port 37. Similarly, a third calibrated leakage 49.1 is established between the fourth outlet conduit 38.1 and the second chamber 42. A fourth calibrated leakage 49.2 is established between the fourth outlet conduit 38.1 and the fourth chamber 45.

The first leakage 48.1 and the third leakage 49.1 act as two first restrictors which connect the first supply port 35 to the first outlet port 37 and to the second outlet port 38.

The second leakage 48.2 and the fourth leakage 49.2 act as two second restrictors which connect the second supply port 36 to the first outlet port 37 and to the second outlet port 38.

Figure 10:
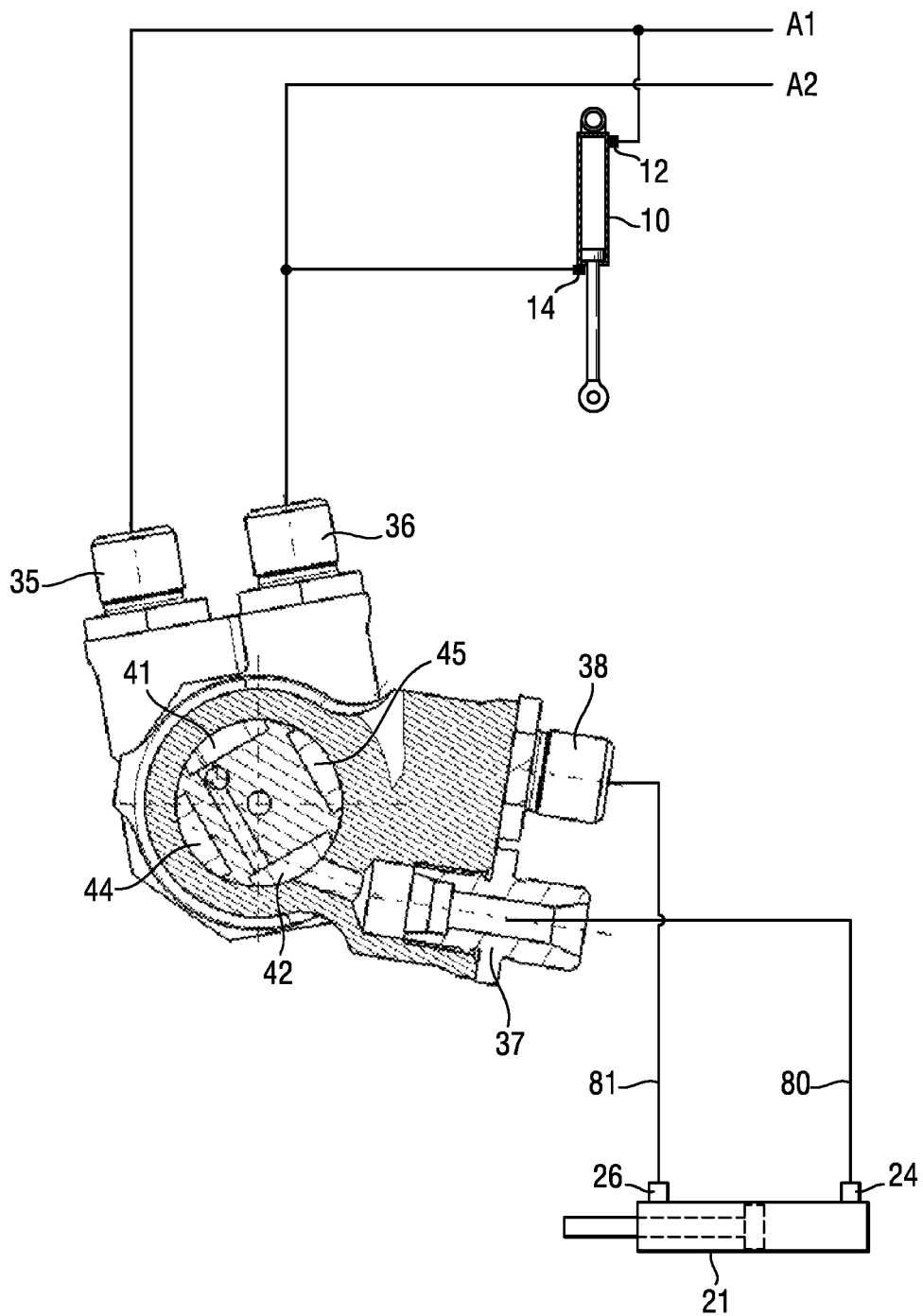
FIG. 10 is a schematic detailed view of the distributor of FIG. 5 in a third state along the first cut plane.
Figure 11:
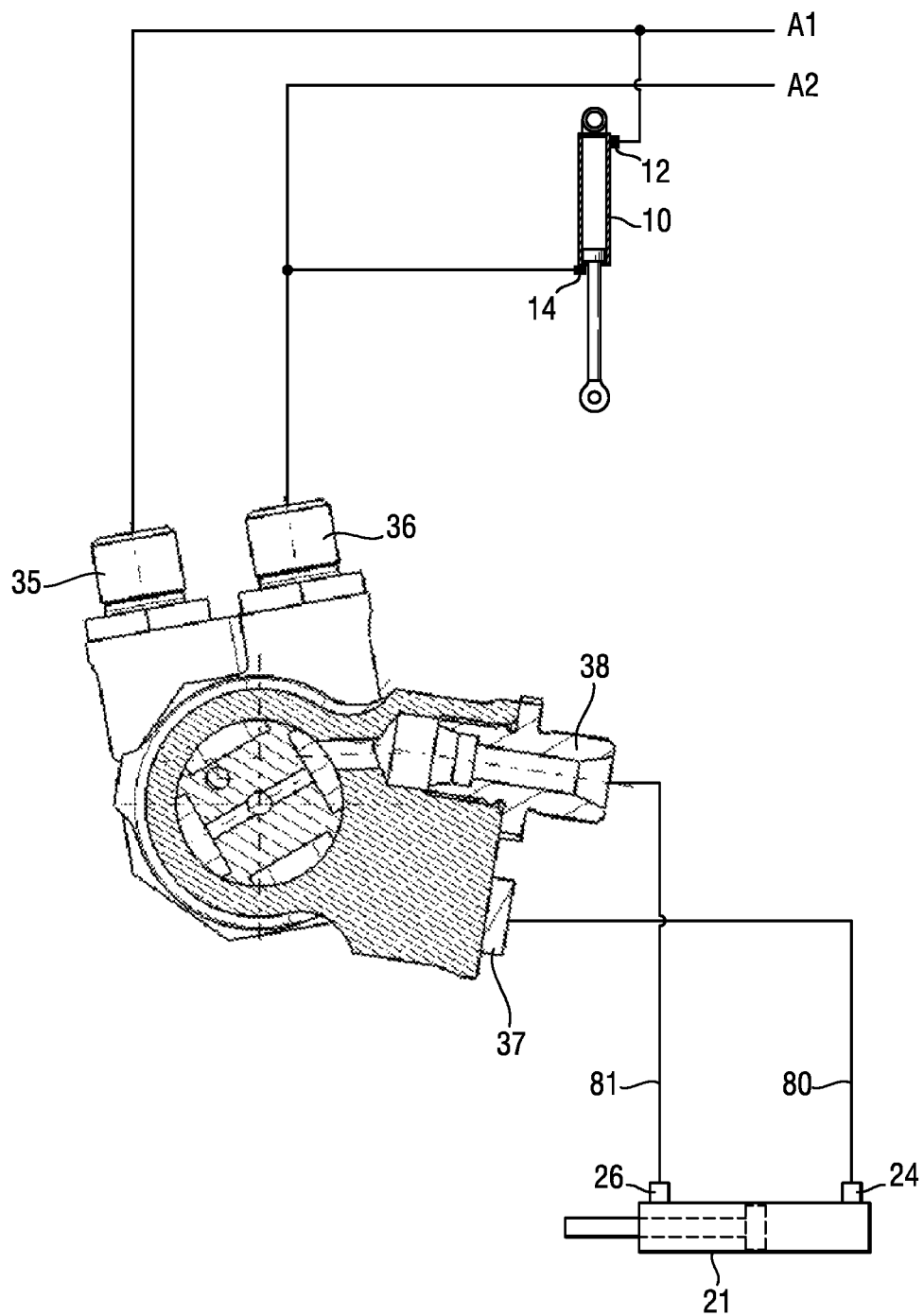
FIG. 11 is a view identical to that of FIG. 10 established along the second cut plane.

In a third state represented in FIGS. 10 and 11, and which corresponds to a third relative angular position of the plug 31.1 in the sleeve 32 of between ninety and one hundred and eighty degrees of deviation, the first supply port 35 supplies the first outlet port 37 (FIG. 10) via the second chamber 42. Equivalently, the second supply port 36 supplies the second outlet port 38 (FIG. 11) via the fourth chamber 45.

Figure 12:
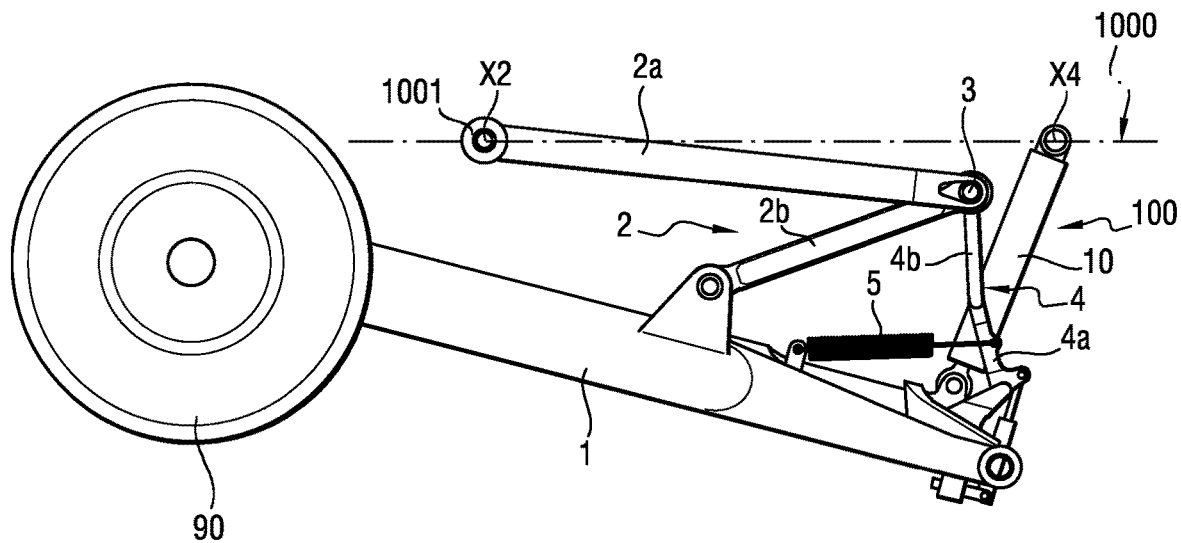
FIG. 12 is a schematic view of the landing gear of FIG. 1 in a first position.
Figure 13:
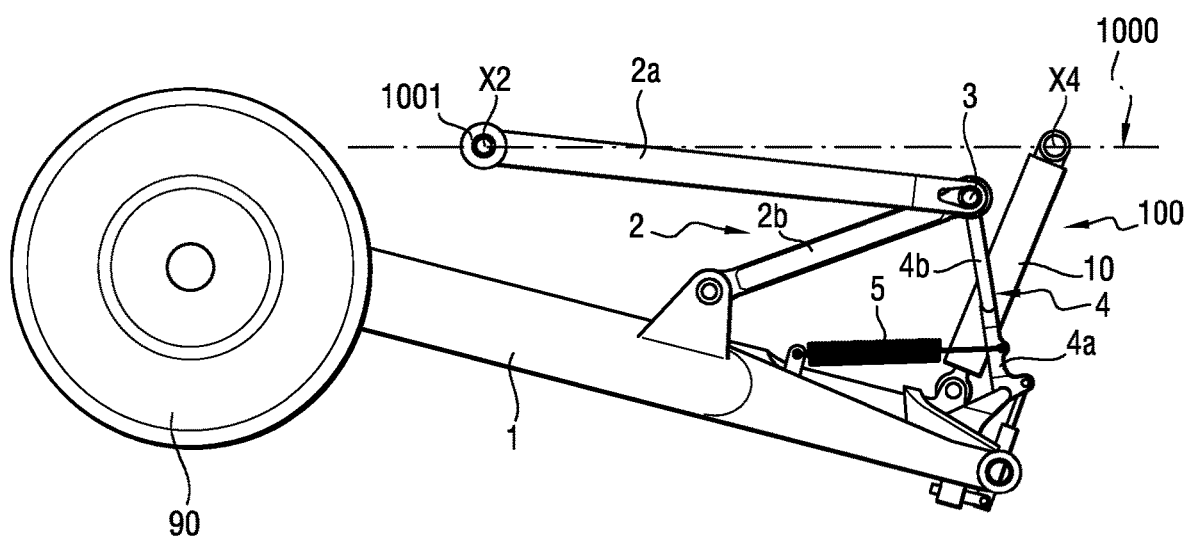
FIG. 13 is a schematic view of the landing gear of FIG. 1 in a second position.
Figure 14:
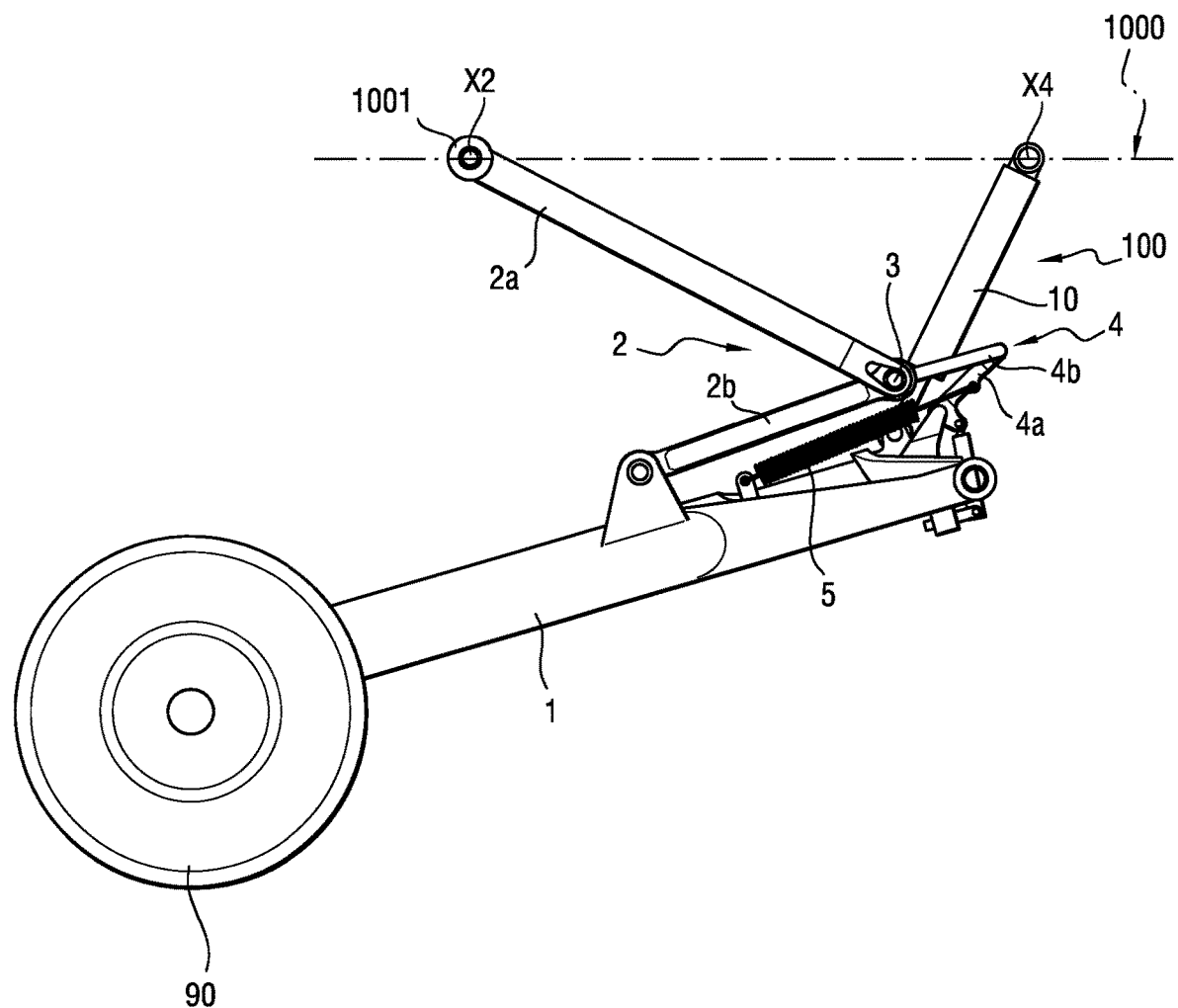
FIG. 14 is a schematic view of the landing gear of FIG. 1 in a third position.
Figure 15:
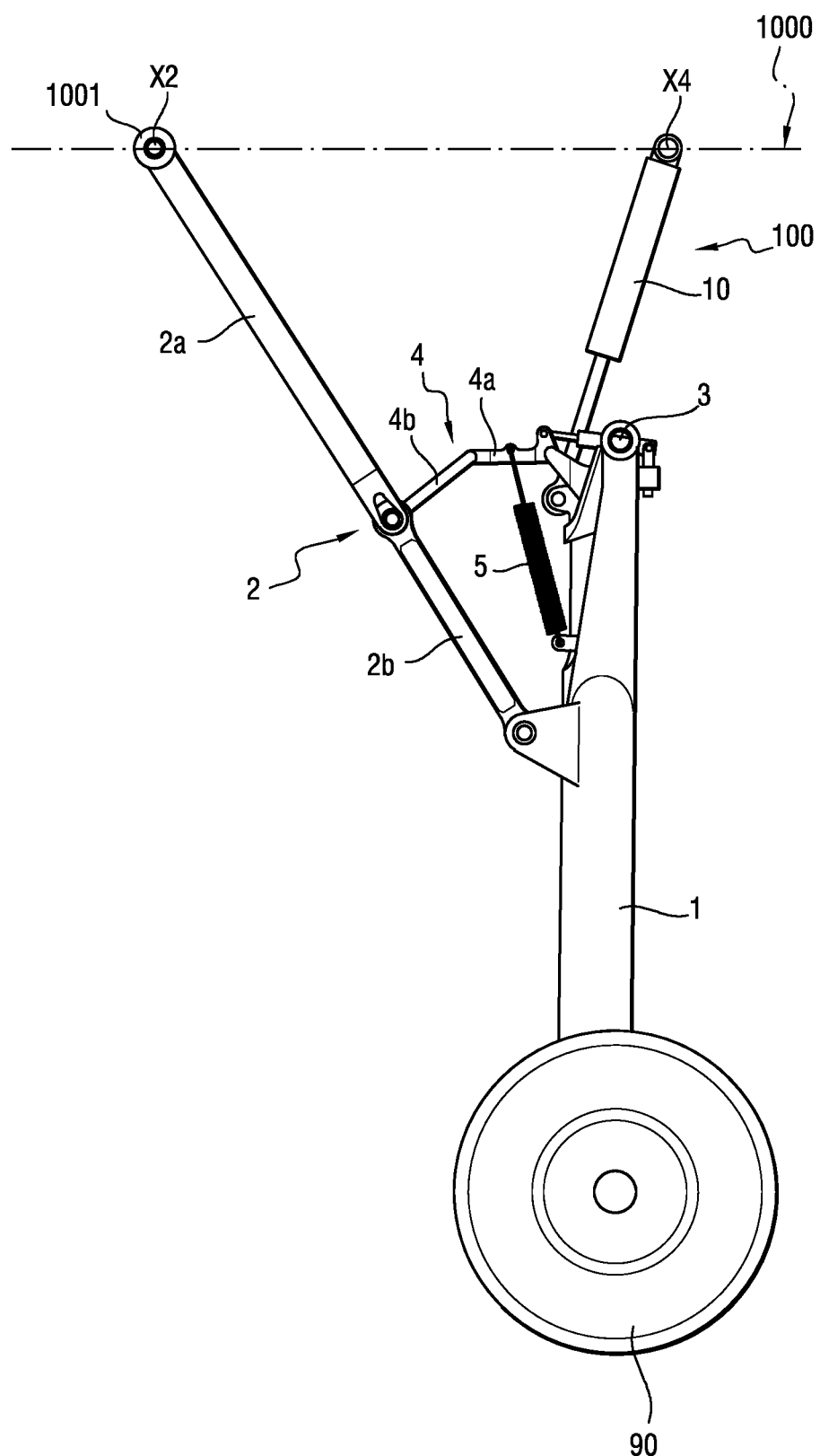
FIG. 15 is a schematic view of the landing gear of FIG. 1 in a fourth position.

In operation, and starting from the retracted position of the landing gear 100 illustrated in FIG. 12, a deployment of the first jack 10 is caused, by controlling the application of a supply pressure in the first supply line A1 and the communicating of the line A2 with a fluid reservoir. The distributor 30 is in its first state represented in FIGS. 5 and 6, and the pressurising of the supply line A1 causes a retraction of the rod of the second jack 21. This exerts a force on the link 4a, which has the effect of making it pivot about its axis of rotation X3 and thus of breaking the alignment of the links 4a, 4b against the action of the spring 5 (FIG. 13). The locking device is thus in the unlocked position and the landing gear 100, under the action of the first jack 10, starts its deployment. The rotation of the strut 1 about the axis X1 causes a relative rotation of the plug 31.1 and of the sleeve 32 which brings the distributor 30 into its second state (FIGS. 7 to 9 and 14). In this second state, the second jack 21 offers no resistance to the movement of the strut 1. A retraction of the rod of the second jack 21 is observed (FIG. 14) during the deployment movement of the landing gear 100, which is not impeded, thanks to the fluid connections of the second state of the distributor 30.

Figure 16:
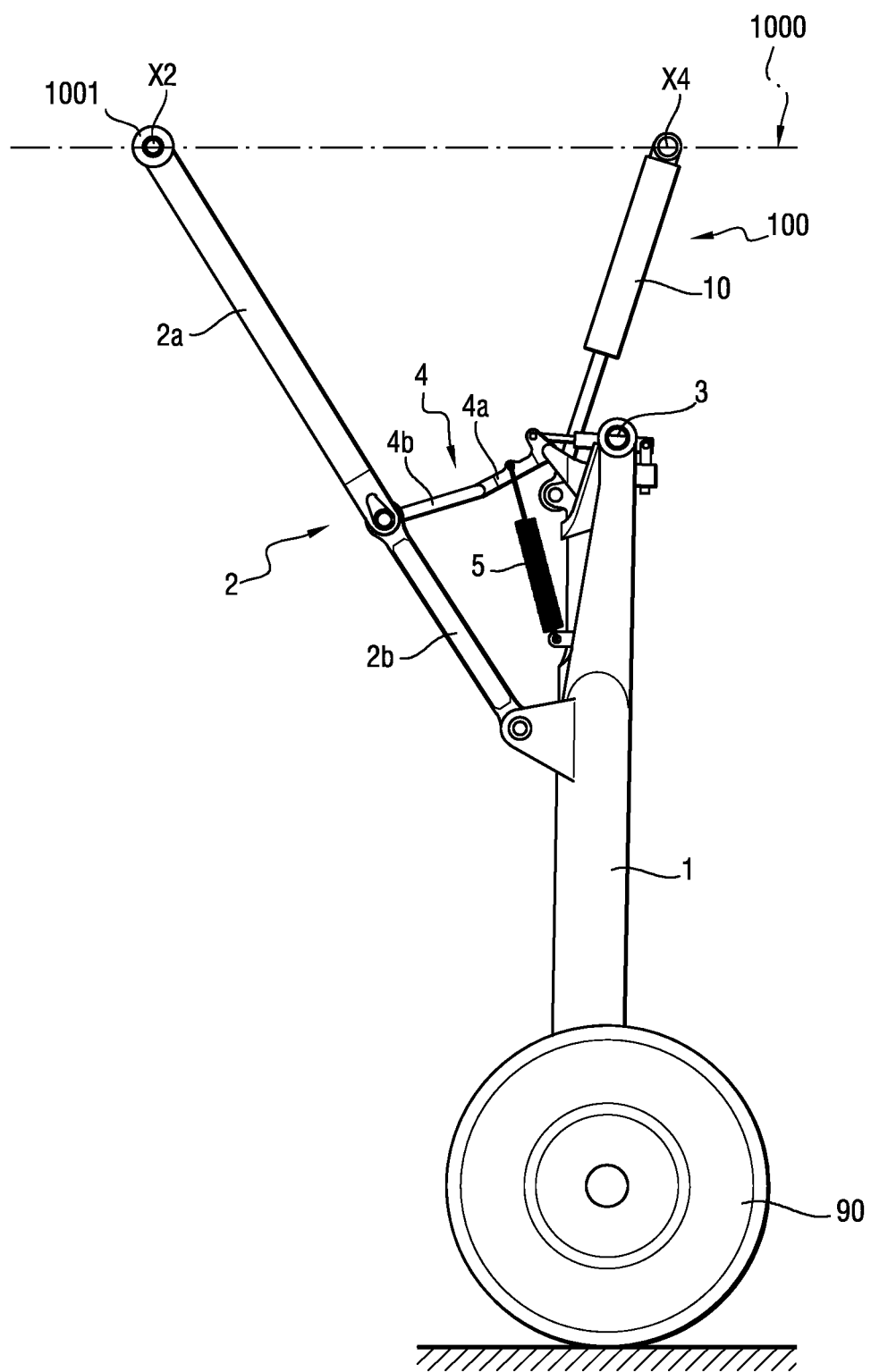
FIG. 16 is a schematic view of the landing gear of FIG. 1 in a fifth position.

Once the landing gear 100 is close to its totally deployed position (FIG. 15), the distributor 30 moves into its third state (FIGS. 10, 11 and 16). The fluid connections thus established make it possible to hold the locking device 20 in the locked position.

During the retraction movement of the landing gear 100, the relative movement of the plug 31.1 in the sleeve 32 is done in the opposite direction, and the "retraction of the second jack 21/second freely moving jack 21" sequence is indexed on the movement of the landing gear 100.

Figure 17:
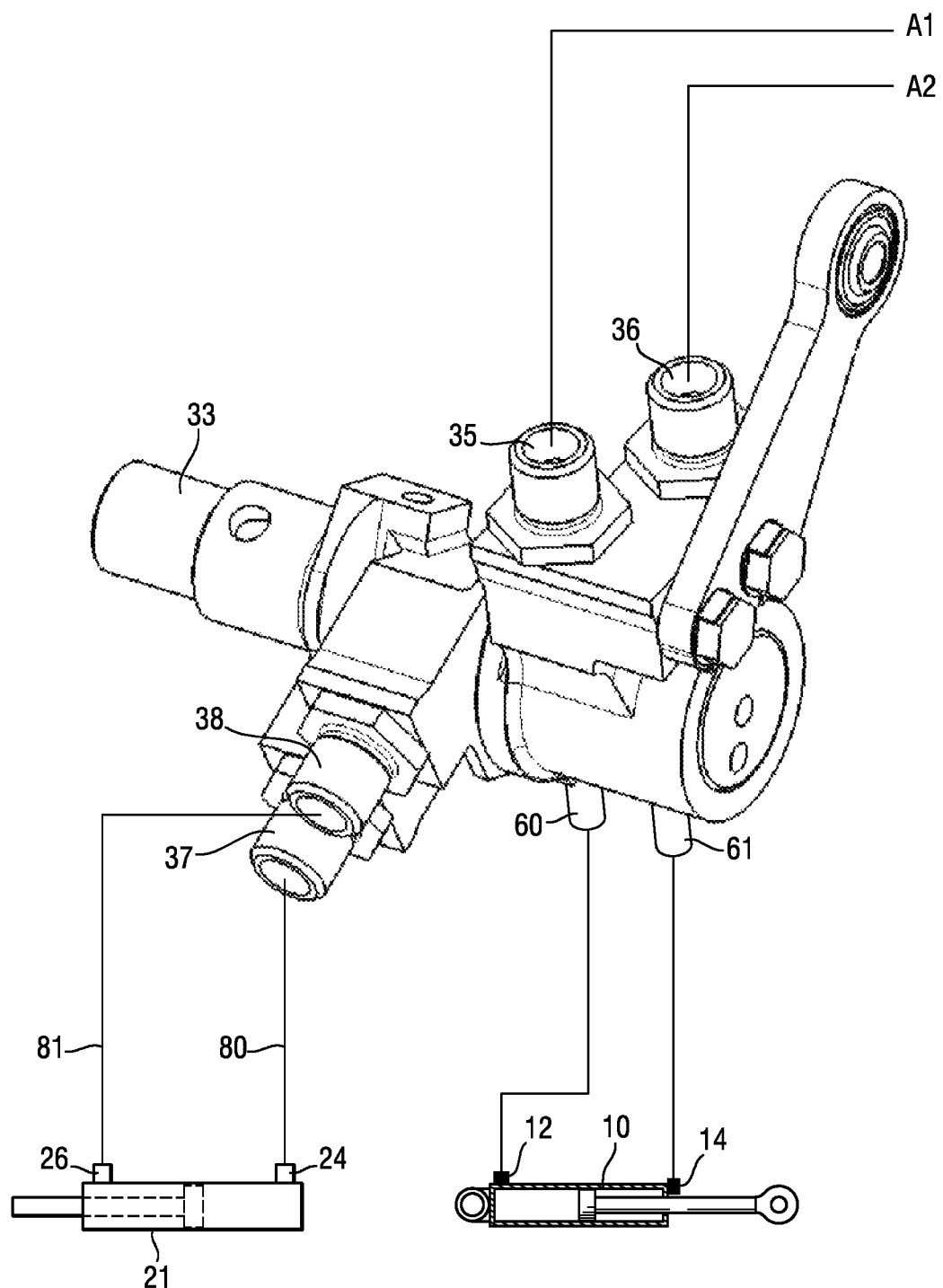
FIG. 17 is a schematic detailed view of a distributor according to a second embodiment of the invention.

According to a second embodiment represented in FIG. 17, the distributor 30 comprises a third outlet port 60 and a fourth outlet port 61. The third port 60 is in contact fluid connection with the first supply port 35 and the fourth outlet port 61 is in constant fluid connection with the second supply port 36. In this embodiment, the third port 60 is connected to the deployment supply port 12 of the first jack 10 and the fourth port 61 is connected to the retraction supply port 14 of the first jack 10.

The invention is not limited to what has just been described, but comprises, on the contrary, any variant entering into the scope defined by the claims.

In particular,

- although, in this case, the locking device comprises a hydraulic jack, the invention also applies to other types of hydraulic actuators, like for example a rotary actuator;
- although, in this case, the distributor comprises a sleeve rigidly connected to a strut of the landing gear and a plug secured to an axis of rotation of the strut on the aircraft, the invention also applies to other types of operational connection of the distributor to the landing gear, like for example, a reducer, a connecting rod/crank system, a toothed belt and toothed wheel connection or any other means making it possible to index a movement of the distributor on the movement of the landing gear during its deployment and its retraction. The distributor can also be connected to another axis of the landing gear, like for example the axis connecting the first deployment jack to the strut, the axis connecting the breaker strut to the strut, the axis connecting one of the links to the strut, the axis connecting the breaker strut to the aircraft, the axis connecting the first deployment jack to the aircraft;
- although, in this case, the plug comprises grooves and bored channels, the invention also applies to other means of selectively connecting the inlet and outlet ports in a rotary distributor, like for example a central supply channel and peripheral channels;
- although, in this case, the rotary distributor comprises a third outlet port and a fourth outlet port respectively in constant fluid connection with the first supply port and the second supply port, the invention also applies to a distributor provided with one single outlet port in constant fluid connection with an inlet port;
- although, in this case, the distributor comprises fixed chambers, in front of which the outlet ports are moved, the invention also applies to fixed ports, in front of which the movable chambers which are connected to one another move, these chambers being able to be implemented, for example, in the form of peripheral grooves in a movable plug;
- although, in this case, the distributor is connected, on the one hand, to a structure of the aircraft and, on the other hand, to a strut of the landing gear, the invention also applies to a distributor with no connection to the aircraft, like for example, a connection, on the one hand, to the strut and, on the other hand, to an axis of rotation of the strut, or also any other pair of elements having a relative indexable movement on the movement of the landing gear;
- although, in this case, the passage between the first state and the second state is made for a relative angular position of the sleeve and of the plug equal to ninety degrees, the invention also applies to other relative angular position values of the sleeve and of the plug for the passage from the first state to the second state. Preferably, the relative angular position of the sleeve and of the plug for which the passage between the first and the second state is made corresponds to the relative angular position of the sleeve and of the plug when the landing gear is halfway through its extension/retraction stroke, a range of more or less ten percent around this value is also preferred;

although, in this case, the invention has been described in connection with a dual-effect unlocking actuator controlled by a rotary distributor comprising a first supply port fluidly connected to the first hydraulic supply, a second supply port fluidly connected to the second hydraulic supply, as well as a first outlet port and a second outlet port fluidly connected to the hydraulic actuator, the invention also applies to a single-effect unlocking actuator coupled with a rotary distributor comprising one single first supply port fluidly connected to the first hydraulic supply and one single first outlet port fluidly connected to the hydraulic actuator.

The invention claimed is:

1. A locking device intended to lock a landing gear mounted in rotation on an aircraft and which is equipped with a deployment hydraulic jack comprising a first chamber connected to a first hydraulic supply and a second chamber connected to a second hydraulic supply, the locking device comprising a hydraulic actuator connected to a rotary distributor, the rotary distributor comprising:
 means for operationally connecting the rotary distributor to the landing gear;
 a first supply port fluidly connected to the first hydraulic supply; and
 a first outlet port fluidly connected to the hydraulic actuator.

2. The locking device according to claim 1, wherein the actuator is a jack comprising a third chamber connected to the first outlet port.

3. The locking device according to claim 2, wherein the actuator comprises a fourth chamber, the rotary distributor comprising a second supply port fluidly connected to the second hydraulic supply and a second outlet port fluidly connected to the fourth chamber.

4. The locking device according to claim 3, wherein the rotary distributor is arranged such that:
 in a first state, the first supply port is connected to the second outlet port and the second supply port is connected to the first outlet port;
 in a second state, the first supply port is connected by a first restrictor to the first outlet port and to the second outlet port, the second supply port is connected by a second restrictor to the first outlet port and to the second outlet port; and
 in a third state, the first supply port is connected to the first outlet port and the second supply port is connected to the second outlet port.

5. The locking device according to claim 3, wherein the means for operationally connecting the rotary distributor to the landing gear comprise a coupling to a strut of the landing gear.

6. The locking device according to claim 3, wherein a first connecting pipe between the first outlet port and the hydraulic actuator and a second connecting pipe between the second outlet port and the hydraulic actuator are rigid.

7. A landing gear intended to be mounted in rotation on an aircraft and equipped with a deployment hydraulic jack comprising a first chamber connected to a first hydraulic supply and a second chamber connected to a second hydraulic supply, the landing gear comprising a locking device according to claim 1.

8. The landing gear according to claim 7, wherein a frame of the hydraulic actuator is secured to a strut of the landing gear which carries a wheel.

9. The landing gear according to claim 7, wherein the locking device comprises a first locking link articulated on a second locking link, the actuator being connected to the first link or the second link.

10. Aircraft comprising the landing gear according to claim 7.

11. A locking device that locks a landing gear mounted in rotation on an aircraft and that includes a deployment hydraulic jack comprising a first chamber connected to a first hydraulic supply and a second chamber connected to a second hydraulic supply, the locking device comprising a hydraulic actuator connected to a rotary distributor, the rotary distributor comprising:
 a coupling operationally connecting the rotary distributor to a strut of the landing gear;
 a first supply port fluidly connected to the first hydraulic supply; and
 a first outlet port fluidly connected to the hydraulic actuator.

* * * * *